(12) United States Patent
Wilke et al.

(10) Patent No.: US 12,466,249 B2
(45) Date of Patent: Nov. 11, 2025

(54) ENERGY STORAGE DEVICE FOR AN ELECTRICALLY POWERED MOTOR VEHICLE

(71) Applicant: MAN Truck & Bus SE, Munich (DE)

(72) Inventors: Florian Wilke, Munich (DE); Sebastian Kratzer, Munich (DE)

(73) Assignee: MAN Truck & Bus SE, Munich (DE)

( * ) Notice: Subject to any disclaimer, the term of this patent is extended or adjusted under 35 U.S.C. 154(b) by 291 days.

(21) Appl. No.: 18/230,343

(22) Filed: Aug. 4, 2023

(65) Prior Publication Data
US 2024/0042844 A1 Feb. 8, 2024

(30) Foreign Application Priority Data
Aug. 4, 2022 (DE) .................. 10 2022 119 605.4

(51) Int. Cl.
*H01M 50/242* (2021.01)
*B60K 1/04* (2019.01)
(Continued)

(52) U.S. Cl.
CPC .............. *B60K 1/04* (2013.01); *B60L 53/80* (2019.02); *H01M 50/244* (2021.01);
(Continued)

(58) Field of Classification Search
CPC ............. H01M 50/242; H01M 50/244; H01M 50/249; H01M 50/253; H01M 50/264;
(Continued)

(56) References Cited

U.S. PATENT DOCUMENTS

2021/0296745 A1 9/2021 Nakashima et al.
2024/0178496 A1* 5/2024 Lee ..................... H01M 50/209
(Continued)

FOREIGN PATENT DOCUMENTS

FR 3078048 A1 8/2019
JP 2014186970 A 10/2014

OTHER PUBLICATIONS

Extended European search report issued in European Patent Application No. 23188977.5 dated Sep. 17, 2024 with English translation.
(Continued)

*Primary Examiner* — Erick R Solis
(74) *Attorney, Agent, or Firm* — Weber Rosselli & Cannon LLP

(57) ABSTRACT

The invention relates, inter alia, to an energy storage device (10) for an electrically powered motor vehicle. A first support element (18) is arranged between one end (20) of a stiffening strut (16) and a battery housing (14).
The first support element (18) supports the stiffening strut (16) on the battery housing (14), wherein a cross-section of the first support element (18) increases from the end (20) of the stiffening strut (16) towards the battery housing (14).
A second support element (26) is arranged between a battery cell stack end side (13) and the battery housing (14). The second support element (26) supports the battery cell stack (12) on the battery housing (14), wherein a cross-section of the second support element (26) decreases from the battery cell stack end side (13) towards the battery housing (14).

20 Claims, 1 Drawing Sheet

(51) Int. Cl.
  *B60L 53/80*      (2019.01)
  *H01M 50/244*     (2021.01)
  *H01M 50/249*     (2021.01)
  *H01M 50/253*     (2021.01)
  *H01M 50/264*     (2021.01)
  *H01M 50/289*     (2021.01)

(52) U.S. Cl.
  CPC ....... *H01M 50/249* (2021.01); *H01M 50/253* (2021.01); *H01M 50/264* (2021.01); *H01M 50/289* (2021.01); *H01M 2220/20* (2013.01)

(58) Field of Classification Search
  CPC . H01M 50/289; H01M 50/291; H01M 50/293
  USPC ........................................................ 180/68.5
  See application file for complete search history.

(56) References Cited

U.S. PATENT DOCUMENTS

| | | | |
|---|---|---|---|
| 2024/0413470 A1* | 12/2024 | Lee .................... | H01M 50/264 |
| 2025/0158205 A1* | 5/2025  | Lee .................... | H01M 50/204 |
| 2025/0192296 A1* | 6/2025  | Taylor ................ | H01M 50/293 |
| 2025/0192330 A1* | 6/2025  | Taylor ................ | H01M 50/517 |
| 2025/0202008 A1* | 6/2025  | Hur .................... | H01M 50/224 |
| 2025/0219228 A1* | 7/2025  | Häupler ............. | H01M 10/615 |

OTHER PUBLICATIONS

German Search Report issued in German Patent Application No. 102022119605.4 dated May 3, 2023. English translation not available.

\* cited by examiner

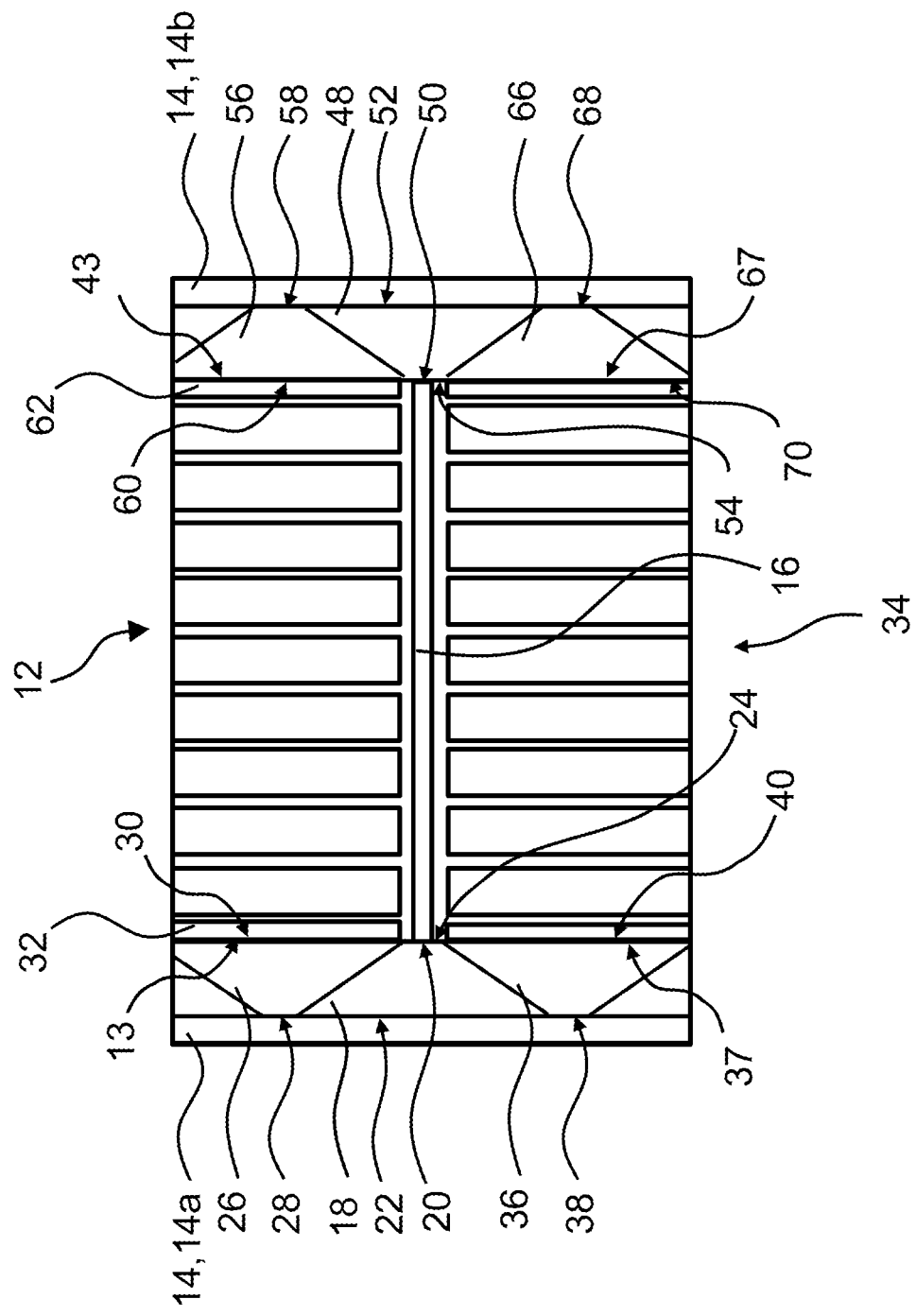

ENERGY STORAGE DEVICE FOR AN ELECTRICALLY POWERED MOTOR VEHICLE

CROSS-REFERENCE TO RELATED APPLICATIONS

This application claims benefit of and priority to German Patent Application Serial No. DE102022199605.4 filed Aug. 4, 2022, the disclosure of which is hereby incorporated by reference in its entirety.

The invention relates to an energy storage device for an electrically powered motor vehicle.

Vehicle batteries known in practice, such as those used as energy storage devices or as traction batteries in hybrid vehicles or electric vehicles, typically have a modular structure, i.e. they are formed by several connected battery modules. Each battery module comprises several battery storage cells arranged in a stack. The connected battery modules are surrounded by a housing, e.g. to protect them from external damage in an accident situation.

To increase the energy density and to reduce the number of parts and the weight of the vehicle battery, the so-called "cell-to-pack" technology can be used in practice. In this process, the individual battery cells are integrated directly into the battery housing without first being combined into battery modules.

Due to ageing, the individual battery cells of the battery cell stack can expand over their service life (so-called "cell swelling"), which can have a detrimental effect on their service life. In order to integrate the battery cells into the battery housing and to be able to counteract this age-related expansion by absorbing the forces arising due to the expansion of the battery cells in the battery cell stack, tensioning or clamping elements are used in known solutions.

US 2021/0296745 A describes the insertion of two tapered elements into a space between a battery body and a battery housing to brace the battery body.

In these known solutions, this bracing of the battery cell stack in the battery housing or in the battery module can also have a detrimental effect, particularly in the event of a crash, since forces acting on the energy storage device from the outside are transmitted to the battery cell stack via the tensioning or clamping elements. In accident situations, the battery cell stack can be damaged as a result.

It is the task of the present invention to provide a technique for accommodating a battery cell stack in the battery housing, with which disadvantages of known approaches can be avoided. In particular, it is the task of the invention to improve known energy storage devices with regard to crash safety.

These tasks are solved by devices and methods with the features of the independent claim. Advantageous further developments are indicated in the dependent claims and the description.

A basic idea of the invention is to provide a first support element between the battery cell stack and the battery housing, the larger face of which supports or transitions into the battery housing and the smaller face of which supports or transitions into a stiffening strut of the energy storage device. Furthermore, a second support element is provided between the battery cell stack and the battery housing, the smaller face of which supports or transitions into the battery housing and the larger face of which supports or transitions into the battery cell stack.

One aspect relates to an energy storage device for storing electric energy for an electrically powered (driven) motor vehicle.

The energy storage device comprises a battery cell stack, a battery housing and a stiffening strut. The battery housing accommodates the battery cell stack. The stiffening strut extends (e.g. parallel to the battery cell stack, preferably parallel to a stacking direction of the battery cell stack) through the battery housing.

The energy storage device further comprises a support device. The support device comprises a first support element and a second support element.

The first support element is arranged between an end of the stiffening strut and the battery housing.

The first support element supports the stiffening strut on (against) the battery housing. A cross-section of the first support element increases (e.g. wedge-shaped) from the end of the stiffening strut towards the battery housing.

The second support element is arranged between a battery cell stack end side and the battery housing. The second support element supports the battery cell stack on (against) the battery housing. A cross-section of the second support element decreases (e.g. wedge-shaped) from the battery cell stack end side towards the battery housing.

One advantage of the invention may be that forces acting on the energy storage device from the outside in the event of a crash are absorbed over a large area by means of the first support element and are directed past the battery cell stack to the stiffening strut. This prevents or reduces damage to the battery cell stack in the event of a crash. At the same time, swelling forces that occur in the battery cell stack, e.g. due to age-related expansion of the battery cells, can be absorbed over a large area by means of the second support element, supported on the battery housing and the expansion of the battery cell stack can thus be counteracted. This can increase the service life of the battery cells.

In a manner known per se, the energy storage device can be configured to store electric energy that can be converted into drive energy in corresponding drive components of the motor vehicle, e.g. in an electric motor. In other words, the energy storage device can be configured to temporarily store traction energy. The energy storage device may also be referred to as a traction battery.

The battery cell stack may comprise a plurality of storage cells (e.g. pouch storage cells or prismatic storage cells) arranged one behind the other in a stacking direction. The battery cell stack end side may be, for example, an end face of the battery cell stack, preferably as viewed in the stacking direction.

In one embodiment, the first support element may comprise a first face and a (e.g. opposite) second face. The first face may be a first cross-sectional face at which the first support element transitions into the battery housing (e.g. integrally one-piece). Alternatively, the first face may be a first abutment face at which the first support element is supported on the battery housing. The second face may be a second cross-sectional face at which the first support element transitions into the end of the stiffening strut (e.g. integrally one-piece). Alternatively, the second face may be a second abutment face at which the first support element is supported at the end of the stiffening strut.

Alternatively or additionally, the second support element may comprise a first face and an (e.g. opposing) second face. The first face may be a first cross-sectional face at which the second support element transitions into the battery housing (e.g. integrally one-piece). Alternatively, the first face may be a first abutment face at which the second support element is supported on the battery housing. The second face may be a second cross-sectional face at which the second support element transitions into the battery cell stack end side (e.g. integral with a load distribution plate or frame at the battery cell stack end side). Alternatively, the second face may be a second abutment face against which the second support element is supported at the battery cell stack end side.

Preferably, the first abutment face of the first support element and/or the first abutment face of the second support element can be supported on the battery housing in full-surface abutment.

However, it is also conceivable that the first abutment face of the first support element and/or the first abutment face of the second support element is only indirectly supported on the battery housing (e.g. with a component arranged in between). Similarly, the second abutment face of the first support element can be fully supported on the stiffening strut. However, it is also conceivable that the second abutment face of the first support element is only indirectly supported on the stiffening strut (e.g. with a component arranged in between). Similarly, the second abutment face of the second support element can be supported in full contact with the battery cell stack end side. However, it is also conceivable that the second abutment face of the second support element is only indirectly supported on the battery cell stack end side (e.g. with a component arranged in between). The stiffening strut can, for example, run along a longitudinal outer side of the battery cell stack through the battery housing.

It is conceivable that the first support element comprises a higher stiffness than the second support element, for example due to its shape and/or due to its material.

In one embodiment, the first face of the first support element may be larger than the second face of the first support element. Further, the first face of the second support element may be smaller than the second face of the second support element.

In one embodiment, the first support element may comprise a wedge-shaped, pointed or tapered outer contour extending between the first face and the second face. Alternatively or additionally, the second support element may comprise a wedge-shaped, pointed or tapered outer contour extending between the second face and the first face. For example, the aforementioned outer contours may each extend from the first face to the second face. In this way, increases in stress in the support elements, for example due to a notch effect, can be avoided.

In one embodiment, the first support element may comprise a prismatic body with a trapezoidal cross-section. The first face may be a base face (e.g. a base) of the trapezoidal cross-section and the second face may be a further base face of the trapezoidal cross-section opposite to the base face. The trapezoidal cross-section may be isosceles. However, it is also conceivable that the legs of the trapezoidal cross-section comprise unequal lengths.

Alternatively or additionally, the second support element may comprise a prismatic body having a trapezoidal cross-section. The first face may be a base face (e.g. a base) of the trapezoidal cross-section and the second face may be a further base face of the trapezoidal cross-section opposite to the base face. The trapezoidal cross-section may be isosceles. However, it is also conceivable that the legs of the trapezoidal cross-section comprise unequal lengths.

In one embodiment, the first face of the first support element may be arranged plane-parallel to (e.g. in a plane with) the first face of the second support element. Alternatively or additionally, the second face of the first support element may be arranged plane-parallel to (e.g. in a plane with) the second face of the second support element.

It is also conceivable that the first support element comprises a prismatic base body having a trapezoidal cross-section and the second support element comprises a prismatic base body having a trapezoidal cross-section, wherein the first support element and the second support element are connected (e.g. directly) such that the connected base bodies comprise a prismatic body having a trapezoidal cross-section (e.g. having a parallelogram-shaped cross-section).

Alternatively or additionally, the first support element and the second support element may comprise a substantially equal wedge angle. The wedge angle can, for example, be understood as an angle enclosed by imaginary extensions of the legs of a trapezoidal cross-section.

It is conceivable that the first support element and the second support element are interlocked and/or intermeshing.

In one embodiment, the first face of the first support element may be larger (e.g. at least twice or at least three times or at least four times) than the first face of the second support element. This advantageously reduces the absorption of forces acting on the energy storage device from the outside in the event of a crash by the second support element.

Alternatively or additionally, the second face of the second support element can be larger (e.g. at least twice or at least three times or at least four times) than the second face of the first support element.

Alternatively or additionally, the first face of the first support element may be at least two times (e.g. at least three times or at least four times) larger than the second face of the first support element. In an accident situation, this can result in the first support element absorbing the forces acting on the energy storage device from the outside over a particularly large area.

Alternatively or additionally, the second face of the second support element can be at least twice (e.g. at least three times or at least four times) larger than the first face of the second support element. This allows the swelling forces to be absorbed by the second support element over a particularly large area.

In one embodiment, the first support element may comprise an outer contour extending between the first face and the second face. The second support element may comprise an outer contour opposite the outer contour and corresponding in shape. The outer contour of the first support element and the outer contour of the second support element may be mechanically decoupled and/or spaced apart. For example, the energy storage device may comprise an air gap between the outer contour of the first support element and the outer contour of the second support element. The outer contour of the first support element may be an outer face of a leg of a trapezoidal cross-section of the first support element. The outer contour of the second support element may be an outer face of a leg of a trapezoidal cross-section of the second support element. Advantageously, a transmission of swelling forces from the second support element to the first support element and of crash forces from the first support element to the second support element can be avoided.

In principle, however, it is also conceivable that the first support element comprises a third face and the second support element comprises a third face, wherein the third face of the first support element is supported on and/or rests against and/or is fastened over its entire surface to the third face of the second support element.

In one embodiment, the second face of the first support element may not be supported on the battery cell stack end side. Alternatively or additionally, the second face of the second support element may not be supported on the stiffening strut. This may have the advantage that swelling forces are not transmitted to the first support element and crash forces are not transmitted to the second support element.

In one embodiment, the first support element may be integrally connected to the battery housing and the stiffening strut. Alternatively, the first support element may be a separate component from the battery housing and the stiffening strut.

It is conceivable that the first support element and/or the second support element is form-fittingly fastened (e.g. by means of a tongue-and-groove connection) and/or force-fittingly fastened (e.g. by means of a screw connection) and/or materially fastened (e.g. by means of welding or bonding) to the battery housing. It is also conceivable that the first support element is form-fittingly fastened (e.g. by means of a tongue-and-groove connection) and/or force-fittingly fastened (e.g. by means of a screw connection) and/or materially fastened (e.g. by means of welding or bonding) to the stiffening strut.

In one embodiment, the first support element may comprise a harder material and/or a lower deformability and/or a higher stiffness than the second support element. Alternatively or additionally, the first support element may comprise a metallic material and the second support element may comprise a plastic material. This may cause the second support element to deform as a type of intrusion volume and/or crumple volume in the event of a crash, which may mitigate onward transmission of forces to the battery cell stack.

In one embodiment, the energy storage device may comprise a distribution plate (e.g. a load distribution plate). The distribution plate may be arranged between the second face of the second support element and the battery cell stack end side. This may result in a reduction of the surface pressure at the battery cell stack end side and thus the stress on the battery cell stack.

In one embodiment, the first support element and/or the second support element may comprise a lower thermal conductivity than the battery housing. Alternatively or additionally, the first support element and/or the second support element may thermally insulate the battery cell stack from the battery housing. For example, a thermal insulating effect may be achieved by the first support element and/or the second support element. The first support element and/or the second support element can thus additionally serve to thermally insulate the energy storage device in a kind of dual function.

In one embodiment, a height of the first support element may extend over at least 50% of a height of the battery cell stack end side (e.g. over an overall height of the battery cell stack end side) or over 50% of a height of the end of the stiffening strut (e.g. over an overall height of the end of the stiffening strut). Alternatively or additionally, a height of the second support element may extend over at least 50% of a height of the battery cell stack end side (e.g. over an overall height of the battery cell stack end side). This may reduce the surface pressures and the stresses in the first support element and/or the second support element.

In one embodiment, the energy storage device may comprise a further battery cell stack received in the battery housing and arranged adjacent (e.g. parallel) to the battery cell stack.

The stiffening strut may be arranged between the battery cell stack and the further battery cell stack. The support device may comprise a third support element arranged between a battery cell stack end side of the further battery cell stack and the battery housing and supporting the further battery cell stack on the battery housing, wherein a cross-section of the third support element decreases from the battery cell stack end side towards the battery housing (e.g. wedge-shaped).

In one embodiment, the second support element and the third support element may span a space (e.g., a prismatic space having a trapezoidal cross-section) in which the first support element is arranged. For example, the spanned space may correspond to an outer contour of the first support element.

Preferably, the first support element may engage or be interlocked with a space between the second support element and the third support element.

In a further embodiment, the third support element may comprise a first face and a second face. The first face may be a first cross-sectional face at which the third support element transitions into the battery housing (e.g. integral-one piece). Alternatively, the first face may be a first abutment face at which the third support element is supported on the battery housing. The second face may be a second cross-sectional face at which the third support element transitions into the battery cell stack end side (e.g. integral with a load distribution plate at the battery cell stack end side). Alternatively, the second face may be a second abutment face against which the third support element is supported on the battery cell stack end side of the further battery cell stack. The first face may be smaller than the second face.

Preferably, the third support element may comprise the same features as the second support element. For example, the second and third support elements may be like parts.

Preferably, the first support element and the second support element and optionally the third support element may be arranged directly adjacent to each other.

In one embodiment, the energy storage device may comprise a further support device. The further support device may comprise a first support element and a second support element. The first support element may be arranged between a further end of the stiffening strut opposite the end and comprise a first face and a second face.

The first support element of the further support device may support the stiffening strut on the battery housing. A cross-section of the first support element may increase from the further end of the stiffening strut towards the battery housing.

The second support element of the further support device may support the battery cell stack against the battery housing. A cross-section of the second support element may decrease from the further battery cell stack end side towards the battery housing.

The first support element of the further support device may comprise a first face and a second face. The first face may be a first cross-sectional face at which the first support element transitions into the battery housing (e.g. integral-one piece). Alternatively, the first face may be a first abutment face at which the first support element is supported on the battery housing. The second face may be a second cross-sectional face at which the first support element transitions into the further end of the stiffening strut (e.g. integral one-piece). Alternatively, the second face may be a second abutment face at which the first support element is supported on the battery housing.

Alternatively or additionally, the second support element of the further support device may comprise a first face and a second face. The first face may be a first cross-sectional face at which the second support element transitions into the battery housing (e.g. integrally one-piece). Alternatively, the first face may be a first abutment face at which the second support element is supported on the battery housing. The second face may be a second cross-sectional face at which the second support element transitions into the further battery cell stack end side (e.g. integral with a load distribution plate at the further battery cell stack end side). Alternatively, the second face may be a second abutment face on which the second support element is supported on the battery housing.

In other words, the energy storage device may comprise the support device and the further support device on opposite end faces of the battery cell stack. This may result in a symmetrical stress distribution. Furthermore, the battery cell stack can thus be protected from damage from both opposite sides in the event of a crash.

In one embodiment, at least one of the following features may be fulfilled with respect to the further support device:

- The first support element may comprise a wedge-shaped, pointed or tapered outer contour extending between the first face and the second face.
- The second support element may comprise a wedge-shaped, pointed or tapered outer contour extending between the second face and the first face.
- The first support element may comprise a prismatic body having a trapezoidal cross-section, the first face being a base face (e.g. a base) of the trapezoidal cross-section and the second face being a further base face of the trapezoidal cross-section opposite the base face.
- The second support element may comprise a prismatic body having a trapezoidal cross-section, the first face being a base side (e.g. a base) of the trapezoidal cross-section and the second face being a further base side of the trapezoidal cross-section opposite to the base side.
- The first support element and the second support element may be arranged relative to each other so as to form an overall prismatic body having a trapezoidal cross-section, preferably a parallelogram-shaped cross-section.
- The first face of the first support element may be arranged plane-parallel to (e.g. in a plane with) the first face of the second support element. The second face of the first support element may be arranged plane-parallel to (e.g. in a plane with) the second face of the second support element. It is also conceivable that the first support element comprises a prismatic body having a trapezoidal cross-section and the second support element comprises a prismatic body having a trapezoidal cross-section, wherein the first support element and the second support element are connected (e.g. directly) such that the connected bodies comprise a prismatic body having a trapezoidal cross-section (e.g. a parallelogram-shaped cross-section).
- The first support element and the second support element may comprise a substantially equal wedge angle. The wedge angle may, for example, be understood as an angle enclosed by imaginary extensions of the legs of a trapezoidal cross-section.
- The first face of the first support element may be larger (e.g. at least twice or at least three times or at least four times) than the first face of the second support element.
- The second face of the first support element may be (e.g. at least two times or at least three times or at least four times) smaller than the second face of the second support element.
- The first face of the first support element may be at least two times (e.g. at least three times or at least four times) larger than the second face of the first support element. In an accident situation, this can result in the first support element absorbing the forces acting on the energy storage device from the outside over a particularly large area.
- The first face of the second support element can be at least twice (e.g. at least three times or at least four times) smaller than the second face of the second support element. This allows swelling forces to be absorbed over a particularly large area by the second support element in an accident situation.
- The first support element may comprise a harder material and/or a lower deformability and/or a higher stiffness than the second support element.
- The first support element may comprise a metallic material and the second support element may comprise a plastic material.
- The energy storage device may comprise a further distribution plate (e.g. a load distribution plate) arranged between the second face of the second support element and the further battery cell stack end side.
- The first support element may comprise an outer contour extending between the first face and the second face. The second support element may comprise an outer contour opposite to the outer contour and corresponding in shape, wherein the outer contour of the first support element and the outer contour of the second support element are mechanically decoupled and/or spaced apart.
- The first support element and/or the second support element may comprise a lower thermal conductivity than the battery housing. Alternatively or additionally, the first support element and/or the second support element may thermally insulate the battery cell stack from the battery housing.
- The second face of the first support element may not be supported on the further battery cell stack end side.
- The second face of the second support element may not be supported on the stiffening strut.
- A height of the first support element may extend over at least 50% of a height of the further battery cell stack end side (e.g. over a total height of the further battery cell stack end side) or over 50% of a height of the further end of the stiffening strut (e.g. over a total height of the end of the stiffening strut).
- A height of the second support element may extend over at least 50% of a height of the further battery cell stack end side (e.g. over an overall height of the further battery cell stack end side).
- The further support device may comprise a third support element arranged between the further battery cell stack end side and the battery housing. The third support element may support the further battery cell stack on the battery housing, wherein a cross-section of the third support element may decrease from the further battery cell stack end side towards the battery housing (e.g. wedge-shaped). The third support element may comprise a first face and a second face, the first face being supported on or transitioning to the battery housing, the second face being supported on or transitioning to the further battery cell stack end side, and the first face being smaller than the second face.

The second support element and the third support element may span a space (e.g. a prismatic space having a trapezoidal cross-section) in which the first support element is arranged.

Another aspect relates to a motor vehicle comprising the energy storage device as disclosed herein. Preferably, the motor vehicle is a utility vehicle. In other words, the utility vehicle may be a motor vehicle designed and configured to carry passengers, transport goods or tow trailer vehicles. For example, the motor vehicle may be a truck, a bus and or an articulated vehicle which is at least partially electrically powered.

The preferred embodiments and features of the invention described above can be combined with each other as desired.

Details and advantages of the invention are described below with reference to the accompanying drawing. It shows:

FIG. 1 an energy storage device according to one embodiment in plan view.

FIG. 1 shows a top view of a section of an energy storage device 10 for an electrically powered motor vehicle (not shown) according to one embodiment.

The energy storage device 10 comprises a battery cell stack 12, a battery housing 14, a stiffening strut 16 and a support device.

The battery cell stack 12 may comprise a plurality of storage cells arranged one behind the other in a stack-like manner in the stacking direction S. These may be, for example, pouch storage cells or prismatic storage cells.

The battery cell stack 12 comprises a battery cell stack end side 13. The battery cell stack end side 13 can be arranged, for example, on an end face or end surface of the battery cell stack 12, as seen in the stacking direction S. In principle, however, it is also conceivable that the battery cell stack end side 13 is arranged on a side surface of the battery cell stack 12 running parallel to the stacking direction S (not shown here). It is conceivable that an intermediate element, for example a compression pad, is arranged between individual or all storage cells.

The battery housing 14 accommodates the battery cell stack 12. For example, the battery cell stack 12 can be suspended in the battery housing 14. In FIG. 1, only a left wall section 14a and a right wall section 14b of the battery housing 14 are shown. Preferably, however, the battery housing 14 may comprise further wall sections and thus completely surround the battery cell stack 12.

The stiffening strut 16 extends through the battery housing 14. For example, the stiffening strut 16 may extend parallel to the battery cell stack 12 (see FIG. 1). The stiffening strut 16 may comprise a metallic material, for example.

The support device comprises a first support element 18 and a second support element 26.

The first support element 18 is arranged between an end 20 of the stiffening strut 16 and the battery housing 14 (in FIG. 1: between the end 20 of the stiffening strut 16 and the left wall section 14a of the battery housing 14).

The first support element 18 supports the stiffening strut 16 on the battery housing 14. A cross-section of the first support element 18 increases from the end 20 of the stiffening strut 16 towards the battery housing 14. The cross-section preferably extends normal to the stacking direction S through the first support element 18.

The first support element may comprise a first face 22 and a second face 24.

The first face 22 may be a first cross-sectional face at which the first support element transitions into the battery housing 14 (not shown in FIG. 1). Alternatively, and preferably, the first face 22 may be a first abutment face at which the first support element 18 is supported on the battery housing 14 as shown in FIG. 1.

The second face 24 may be a second cross-sectional face at which the first support element 18 transitions into the end 20 of the stiffening strut 16 (not shown in FIG. 1). Alternatively, and preferably, the second face 24 may be a second abutment face at which the first support element 18 is supported at the end 20 of the stiffening strut 16, as shown in FIG. 1.

The first support element 18 may thus be integrally connected to the battery housing 14 and the stiffening strut 16. Alternatively, and preferably, the first support element 18 may be a separate component from the battery housing 14 and the stiffening strut 16.

The first face 22 may be form-fittingly fastened (for example, by means of a tongue-and-groove connection) and/or force-fittingly fastened (for example, by means of a screw connection) to the left wall section 14a of the battery housing 14. The second face 24 can be fastened to the end 20 of the stiffening strut 16 in a form-fitting manner (e.g. by means of a tongue-and-groove connection) and/or in a force-fitting manner (e.g. by means of a screw connection).

The first face 22 of the first support element 18 may be larger than the second face 24 of the first support element 18.

The first face 22 may be larger than the second face 24. Preferably, the first face 22 of the first support element 18 is at least twice (e.g. at least three times or at least four times) larger than the second face 24 of the first support element 18. It is conceivable that forces acting on the energy storage device 10 from outside in the event of a crash are absorbed over a large area by the first face 22 and are transmitted to the relatively narrow stiffening strut 16 via the second face 24.

The first support element 18 may comprise a wedge-shaped, pointed or tapering outer contour. The outer contour may extend between the first face 22 and the second face 24. Conceivably, the wedge-shaped, pointed or tapered outer contour extends from the first face 22 to the second face 24. Preferably, the outer contour is flat. Further preferably, the outer contour comprises no notches and/or steps.

The first support element 18 may comprise a prismatic body having a trapezoidal cross-section. The first face 22 may be a base face (e.g., a base) of the trapezoidal cross-section. The second face 24 may be a further base face of the trapezoidal cross-section opposite the base face. The trapezoidal cross-section may be isosceles. However, it is also conceivable that the legs of the trapezoidal cross-section comprise different lengths.

It is possible that a height of the first support element 18 extends over at least 50% of a height of the battery cell stack end side 13 (e.g. over an overall height of the battery cell stack end side 13). The height of the first support element 18 may also extend over 50% of a height of the end 20 of the stiffening strut 16 (e.g. over an overall height of the end 20 of the stiffening strut 16). It is additionally conceivable that the height of the first support element 18 extends beyond the battery cell stack end side 13.

The second support element 26 is arranged between a battery cell stack end side 13 and the battery housing 14.

The second support element 26 supports the battery cell stack 12 on the battery housing 14. A cross-section of the second support element 26 increases from the battery cell stack end side 13 towards the battery housing 14. The cross-section preferably extends normal to the stack direction S through the second support element 26.

The first face 28 may be a first cross-sectional face at which the second support element 26 transitions into the battery housing 14 (not shown in FIG. 1). Alternatively, and preferably, the first face 28 may be a first abutment face against which the second support element 26 is supported on the battery housing 14 as shown in FIG. 1.

The second support element 26 may comprise a first face 28 and a second face 30.

The second face 30 may be a second cross-sectional face at which the second support element 26 transitions into the battery cell stack end side 13 (not shown in FIG. 1). Alternatively, and preferably, the second face 30 may be a second abutment face at which the second support element 26 is supported on the battery cell stack end side 13, as shown in FIG. 1.

Thus, the second support element 26 may be integrally connected to the battery housing 14 and the battery cell stack end side 13. Alternatively, the second support element 26 may be a separate component from the battery housing 14 and the battery cell stack end side 13.

The first face 28 of the second support element 26 may be smaller than the second face 30 of the second support element 26.

The first face 28 may be form-fittingly fastened (for example, by means of a tongue-and-groove connection) and/or force-fittingly fastened (for example, by means of a screw connection) to the left wall section 14*a* of the battery housing 14. The second face 30 can be form-fittingly fastened (e.g. by means of a tongue-and-groove connection) and/or force-fittingly fastened (e.g. by means of a screw connection) to the battery cell stack end side 13.

Preferably, the second face 30 of the second support element 26 is at least two times (e.g. at least three times or at least four times) larger than the first face 28 of the second support element 26.

The second support element 26 may comprise a wedge-shaped, pointed or tapered outer contour. The outer contour may extend between the second face 30 and the first face 28. Conceivably, the wedge-shaped, pointed or tapered outer contour extends from the second face 30 to the second face 28. Preferably, the outer contour is flat. Further preferably, the outer contour comprises no notches and/or steps.

The second support element 26 may comprise a prismatic body having a trapezoidal cross-section. The first face 28 may be a base face (e.g., a base) of the trapezoidal cross-section. Further, the second face 30 may be a further base face of the trapezoidal cross-section opposite the base face.

Further, a height of the second support element 26 may extend over at least 50% of a height of the battery cell stack end side 13 (e.g. over an overall height of the battery cell stack end side 13). It is additionally conceivable that the height of the second support element 26 extends beyond the battery cell stack end side 13.

The first face 22 of the first support element 18 can be larger than the first face 28 of the second support element 26. It is conceivable, for example, that the first support element 18 is supported on a face on the battery housing 14 (in FIG. 1: left wall section 14*a* of the battery housing 14) which is, for example, at least twice or at least three times or at least four times larger than the second support element 26.

Furthermore, it is conceivable that the second face 30 of the second support element 26 is larger (e.g. at least twice or at least three times or at least four times) than the second face 24 of the first support element 18.

The first face 22 of the first support element 18 may be arranged plane-parallel to (e.g., in a plane with) the first face 28 of the second support element 26. The second face 24 of the first support element 18 may be arranged plane-parallel to (e.g. in a plane with) the second face 30 of the second support element 26.

It is also conceivable that the first support element 18 comprises a prismatic base body having a trapezoidal cross-section and the second support element 26 comprises a prismatic base body having a trapezoidal cross-section. The first support element 18 and the second support element 26 may be connected (e.g. directly) such that the connected base bodies comprise a prismatic body having a trapezoidal cross-section (e.g. a parallelogram-shaped cross-section).

The trapezoidal cross-section can be isosceles. However, it is also conceivable that the legs of the trapezoidal cross-section comprise different lengths.

Further, the first support element 18 and the second support element 26 may comprise a substantially equal wedge angle.

The first support element 18 may comprise a harder material and/or a lower deformability and/or a higher stiffness (e.g. due to the shape and/or due to its material) than the second support element 26.

For example, the first support element 18 may comprise a metallic material (e.g. aluminium or steel). The second support element 26 may comprise a plastic material (e.g. a foam material).

Conceivably, the first support element 18 comprises an outer contour extending between the first face 22 and the second face 24. Further, the second support element 26 may comprise an outer contour opposite to the outer contour and corresponding in shape. The outer contour of the first support element 18 and the outer contour of the second support element 26 may be mechanically decoupled from and/or spaced apart from each other. It is conceivable, for example, that the energy storage device 10 comprises an air gap between the outer contour of the first support element 18 and the outer contour of the second support element 26.

The first support element 18 and/or the second support element 26 may comprise a lower thermal conductivity (e.g., a lower coefficient of thermal conductivity) than the battery housing 14. The first support element 18 and/or the second support element 26 may thermally isolate the battery cell stack 12 from the battery housing 14. In other words, the first support element 18 and/or the second support element 26 may comprise a thermal insulating property. This may be due to its material and/or shape. Exemplarily, the first support element 18 and/or the second support element 26 may comprise a foam material.

Conceivably, the second face 24 of the first support element 18 is not supported on the battery cell stack end side 13. Optionally, the second face 30 of the second support element 26 is not supported on the stiffening strut 16. For example, the first support element 18 may be arranged spaced from the battery cell stack end side 13 and/or the second support element 26 may be arranged spaced from the stiffening strut 16.

The energy storage device 10 may comprise a distribution plate 32. The distribution plate 32 may comprise, for example, a metallic material. For example, the distribution plate 32 is a load distribution plate. The distribution plate 32 may be arranged between the second face 30 of the second support element 26 and the battery cell stack end side 13.

It is conceivable that the energy storage device 10 comprises (at least) one further battery cell stack 34. The further battery cell stack 34 may be received in the battery housing 14 and arranged adjacent (e.g. parallel) to the battery cell stack 12. The stiffening strut 16 may be arranged between the battery cell stack 12 and the further battery cell stack 34. In other words, the battery cell stack 12 and the further battery cell stack 34 may be separated from each other by the stiffening strut 16.

Optionally, the support device may comprise a third support element 36. The third support element 36 may be arranged between a battery cell stack end side 37 of the further battery cell stack 34 and the battery housing 14. The third support element 36 may support the further battery cell stack (34) on the battery housing (14), wherein a cross-section of the third support element (36) may decrease from the battery cell stack end side (37) towards the battery housing (14).

The third support element 36 may comprise a first face 38 and a second face 40.

The first face 38 may be a first cross-sectional face at which the third support element 36 transitions into the battery housing 14 (not shown in FIG. 1). Alternatively and preferably, the first face 38 may be a first abutment face at which the third support element 36 is supported on the battery housing 14 as shown in FIG. 1. The second face 40 may be a second cross-sectional face at which the third support element 36 transitions into the battery cell stack end side 37 (not shown in FIG. 1). Alternatively and preferably, the second face 40 may be a second abutment face at which the third support element 36 is supported on the battery cell stack end side 37, as shown in FIG. 1.

Thus, the third support element 36 may also be integrally connected to the battery housing 14 and the battery cell stack end side 37. Alternatively and preferably, the third support element 36 may be a separate component from the battery housing 14 and the battery cell stack end side 37.

Conceivably, the first face 38 may be supported on the battery housing 14. The second face 40 may be supported on the battery cell stack end side 37 of the further battery cell stack 34. Further, the first face 38 may be smaller than the second face 40.

The second support element 26 and the third support element 36 may span a space (e.g. a prismatic space having a trapezoidal cross-section) in which the first support element 18 is arranged. It is conceivable, for example, that the spanned space corresponds to or follows an outer contour of the first support element 18.

Optionally, the energy storage device 10 comprises a further support device.

The further support device may comprise a first support element 48 and a second support element 56.

The first support element 48 may be arranged between a further end 50 of the stiffening strut 16 opposite the end 20 and the battery housing 14 (in FIG. 1: between the end 50 of the stiffening strut 16 and the right wall section 14b of the battery housing 14).

The first support element 48 may comprise a first face 52 and a second face 54. The first face 52 may be a first cross-sectional face at which the first support element 48 transitions into the battery housing 14 (not shown in FIG. 1). Alternatively and preferably, the first face 52 may be a first abutment face at which the first support element 48 is supported on the battery housing 14 as shown in FIG. 1. The second face 54 may be a second cross-sectional face at which the first support element 48 transitions into the end 50 of the stiffening strut 16 (not shown in FIG. 1). Alternatively and preferably, the second face 54 may be a second abutment face at which the first support element 48 is supported at the end 50 of the stiffening strut 16 as shown in FIG. 1.

The first support element 48 may support the stiffening strut 16 on the battery housing 14. A cross-section of the first support element 48 may increase from the further end 50 of the stiffening strut 16 towards the battery housing 14.

The first face 52 may be supported on the battery housing 14. The second face 54 may be supported at the further end 50 of the stiffening strut 16. The first face 52 may be larger than the second face 54.

The second support element 56 may be arranged between a further battery cell stack end side 43 and the battery housing 14 (in FIG. 1: between the further battery cell stack end side 43 and the right wall section 14b of the battery housing 14). The second support element 56 may comprise a first face 58 and a second face 60.

The second support element 56 may support the battery cell stack 12 on the battery housing 14. A cross-section of the second support element 56 may decrease from the battery cell stack end side 43 towards the battery housing 14.

The second support element 56 may comprise a first face 58 and a second face 60. The first face 58 may be a first cross-sectional face at which the second support element 56 transitions into the battery housing 14 (not shown in FIG. 1). Alternatively, and preferably, the first face 58 may be a first abutment face on which the second support element 56 is supported on the battery housing 14 as shown in FIG. 1. The second face 60 may be a first cross-sectional face at which the second support element 56 transitions into the further battery cell stack end side 43 (not shown in FIG. 1). Alternatively, the second face 60 may be a second abutment face at which the second support element 56 is supported on the further battery cell stack end side 43, as shown in FIG. 1.

The first face 58 may be supported on the battery housing 14. The second face 60 may be supported on the further battery cell stack end side 43. The first face 58 may be smaller than the second face 60.

The first support element 48 of the further support device may be configured analogously to the first support element 18 of the support device (e.g. comprise the same features as the first support element 18 of the support device). In particular, the first support element 48 may be arranged in mirror symmetry to the first support element 18.

The second support element 56 of the further support device may be configured analogously to the second support element 26 of the support device (e.g. comprise the same features as the first support element 26 of the support device). In particular, the second support element 56 may be arranged in mirror symmetry to the second support element 56.

Optionally, the further support device comprises a third support element 66, which may be configured analogously to the third support element 36 of the support device. In particular, the third support element 66 may be arranged in mirror symmetry with respect to the third support element 36.

Although the invention has been described with reference to specific embodiments, it is apparent to one skilled in the art that various modifications may be made and equivalents may be used as substitutes without departing from the scope of the invention. Consequently, the invention is not intended to be limited to the disclosed embodiments, but is intended to encompass all embodiments falling within the scope of the appended claims. In particular, the invention also claims protection for the subject matter and features of the sub-claims independently of the claims referenced. All range indications herein are to be understood as disclosing, as it were, all values falling within the respective range individually, e.g. also as respective preferred narrower outer limits of the respective range.

LIST OF REFERENCE SIGNS 10 energy storage device
12 battery cell stack
13 battery cell stack end side
14 battery housing
14a left wall section of battery housing
14b right wall section of battery housing
16 stiffening strut
18 first support element
20 end of stiffening strut
22 first face of the first support element
24 second face of the first support element
26 second support element
28 first face of the second support element
30 second face of second support element
32 distribution plate
34 further battery cell stack
36 third support element
38 first face of the first support element
40 second face of the third support element
48 first support element
50 further end of stiffening strut
52 first face of first support element
54 second face of the first support element
56 second support element
58 first face of the second support element
60 second face of second support element
62 further distribution plate
66 third support element
67 further end side of the further battery cell stack
68 first face of the first support element
70 second face of the third support element

The invention claimed is:

1. An energy storage device for an electrically powered motor vehicle comprising:
a battery cell stack;
a battery housing that receives the battery cell stack;
a stiffening strut extending through the battery housing; and
a support device comprising:
a first support element arranged between an end of the stiffening strut and the battery housing and supporting the stiffening strut on the battery housing, wherein a cross-section of the first support element increases from the end of the stiffening strut towards the battery housing; and
a second support element arranged between a battery cell stack end side and the battery housing and supporting the battery cell stack on the battery housing, wherein a cross-section of the second support element decreases from the battery cell stack end side toward the battery housing.

2. The energy storage device according to claim 1, wherein
the first support element comprises a first face and a second face, wherein:
the first face is a first cross-sectional face at which the first support element transitions into the first support element or a first abutment face at which the first support element is supported on the battery housing; and
the second face is a second cross-sectional face at which the first support element transitions into the end of the stiffening strut or a second abutment face at which the first support element is supported at the end of the stiffening strut; and
the second support element comprises a first face and a second face, wherein:
the first face is a first cross-sectional face at which the second support element transitions into the battery housing or a first abutment face at which the second support element is supported on the battery housing; and
the second face is a second cross-sectional face at which the second support element transitions into the battery cell stack end side or a second abutment face at which the second support element is supported on the battery cell stack end side.

3. The energy storage device according to claim 2, wherein
the first face of the first support element is larger than the second face of the first support element; and
the first face of the second support element is smaller than the second face of the second support element.

4. The energy storage device according to claim 2, wherein
the first support element comprises a wedge-shaped, pointed or tapered outer contour extending between the first face and the second face; and/or
the first support element comprises a wedge-shaped, pointed or tapered outer contour extending between the second face and the first face.

5. The energy storage device according to claim 2, wherein
the first support element comprises a prismatic body with a trapezoidal cross-section, the first face being a base side of the trapezoidal cross-section and the second face being a further base side of the trapezoidal cross-section opposite to the base side; and/or
the second support element comprises a prismatic body having a trapezoidal cross-section, the first face being a base side of the trapezoidal cross-section and the second face being a further base side, opposite to the base side, of the trapezoidal cross-section.

6. The energy storage device according to claim 5, wherein
the first face of the first support element is a base of the trapezoidal cross-section; and/or
the first face of the second support is a base of the trapezoidal cross-section.

7. The energy storage device according to claim 2, wherein
the first face of the first support element is arranged plane-parallel to the first face of the second support element and/or the second face of the first support element is arranged plane-parallel to the second face of the second support element; and/or
the first support element and the second support element comprise a substantially equal wedge angle.

8. The energy storage device according to claim 7, wherein
the first face of the first support element is arranged in a plane with the first face of the second support element and/or the second face of the first support element is arranged in a plane with the second face of the second support element.

9. The energy storage device according to claim 2, wherein the first face of the first support element is larger than the first face of the second support element; and/or the second face of the second support element is larger than the second face of the first support element; and/or the first face of the first support element is at least two times larger than the second face of the first support element; and/or the second face of the second support element is at least two times larger than the first face of the second support element.

10. The energy storage device according to claim 9, wherein the first face of the first support element is at least twice or at least three times or at least four times larger than the first face of the second support element; and/or the second face of the second support element is at least twice or at least three times or at least four times larger than the second face of the first support element; and/or the first face of the first support element is at least three times or at least four times larger than the second face of the first support element; and/or the second face of the second support element is at least three times or at least four times larger than the first face of the second support element.

11. The energy storage device according to claim 2, wherein the first support element comprises an outer contour extending between the first face and the second face, and the second support element comprises a shape-corresponding outer contour opposite the outer contour, wherein the outer contour of the first support element and the outer contour of the second support element are mechanically decoupled from and/or spaced apart from each other.

12. The energy storage device according to claim 2, wherein the second face of the first support element is not supported on the battery cell stack end side; and/or the second face of the second support element is not supported on the stiffening strut.

13. The energy storage device according to claim 1, wherein the first support element is integrally connected to the battery housing and/or the stiffening strut, or the first support element is a separate component from the battery housing and the stiffening strut.

14. The energy storage device according to claim 1, wherein the first support element comprises a harder material and/or a lower deformability and/or a higher stiffness than the second support element; and/or the first support element comprises a metallic material and the second support element comprises a plastic material; and/or the first support element and/or the second support element comprise a lower thermal conductivity than the battery housing; and/or the first support element and/or the second support element thermally isolate the battery cell stack from the battery housing; and/or the stiffening strut is parallel to the battery cell stack.

15. The energy storage device according to claim 1, wherein:

a height of the first support element extends over at least 50% of a height of the battery cell stack end side or over 50% of a height of the end of the stiffening strut; and/or a height of the second support element extends over at least 50% of a height of the battery cell stack end side.

16. The energy storage device according to claim 1, wherein:

a height of the first support element extends over an overall height of the battery cell stack end side or over an overall height of the end of the stiffening strut; and/or a height of the second support element extends over an overall height of the battery cell stack end side.

17. The energy storage device according to claim 1, further comprising a further battery cell stack received in the battery housing and arranged adjacent to the battery cell stack, the stiffening strut being arranged between the battery cell stack and the further battery cell stack, wherein the support device comprises a third support element arranged between a battery cell stack end side of the further battery cell stack and the battery housing and supporting the further battery cell stack at the battery housing, wherein a cross section of the third support element decreases from the battery cell stack end side towards the battery housing.

18. The energy storage device according to claim 17, wherein the further battery cell stack is arranged parallel to the battery cell stack; and/or the second support element and the third support element span a space in which the first support element is arranged.

19. The energy storage device according to claim 18, wherein the space the second support element and the third support element span is a prismatic space having a trapezoidal cross-section.

20. The energy storage device according to claim 1, comprising a further supporting device, wherein the further supporting device comprises:

a first support element arranged between a further end of the stiffening strut opposite the end and the battery housing and supporting the stiffening strut on the battery housing, wherein a cross-section of the first support element increases from the further end of the stiffening strut towards the battery housing; and a second support element arranged between a further battery cell stack end side and the battery housing and supporting the battery cell stack on the battery housing, wherein a cross-section of the second support element decreases from the further battery cell stack end side towards the battery housing.

* * * * *